United States Patent

[11] 3,536,185

| [72] | Inventor | Jacob Howard Beck<br>Newton, Massachusetts |
| --- | --- | --- |
| [21] | Appl. No. | 754,206 |
| [22] | Filed | Aug. 21, 1968 |
| [45] | Patented | Oct. 27, 1970 |
| [73] | Assignee | BTU Engineering Corporation<br>Waltham, Massachusetts<br>a corporation of Delaware |

[54] FURNACE CONVEYOR DRIVE
6 Claims, 4 Drawing Figs.

| [52] | U.S. Cl. | 198/208 |
| --- | --- | --- |
| [51] | Int. Cl. | B65g 15/30 |
| [50] | Field of Search | 198/208;<br>74/241, 242.11(W) |

[56] References Cited
UNITED STATES PATENTS

| 2,326,098 | 8/1943 | Kimmich | 198/208 |
| 2,577,926 | 12/1951 | Stiles | 198/208 |
| 3,187,881 | 6/1965 | Clark | 74/241 |

*Primary Examiner*—Andres H. Nielsen
*Attorney*—Joseph Zallen

ABSTRACT: The conveyor has an endless metal belt having a load carrying run through the furnace and an empty return run. In order to prevent the rapid deformation, strength loss and deterioration which takes place at the high temperature of a furnace, the tension is maintained at a minimum at no load and is automatically adjusted to the applied load. A pivotally mounted support member carries a pressure pulley and an idler pulley. With load there is pressure on the idler pulley which causes the pressure pulley to press against the driving pulley. The support member has associated means at one end for maintaining the belt tension at a minimum when there is no load.

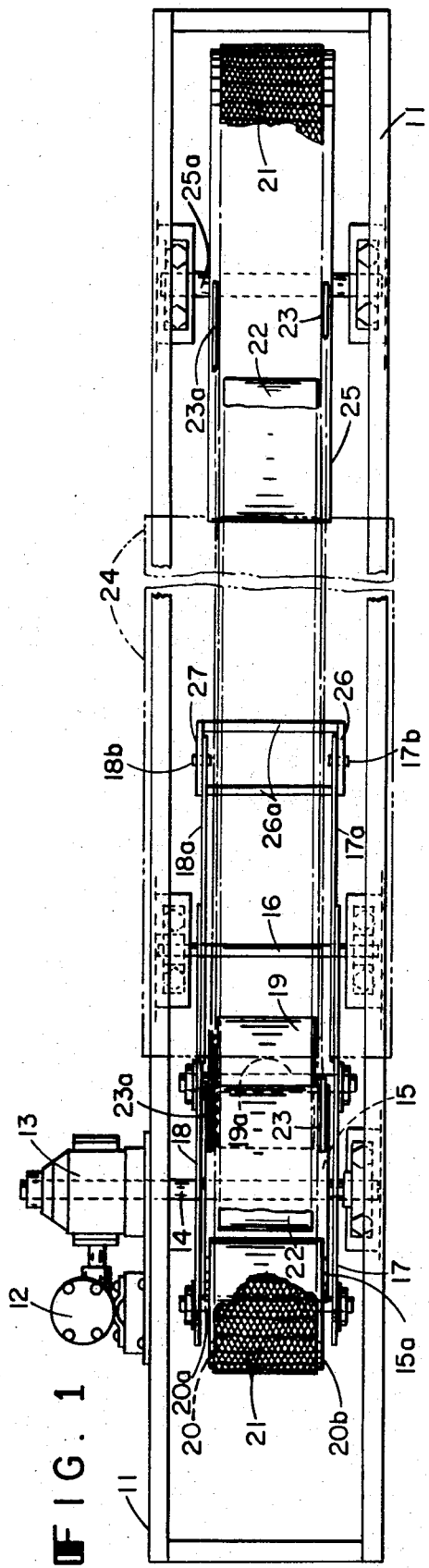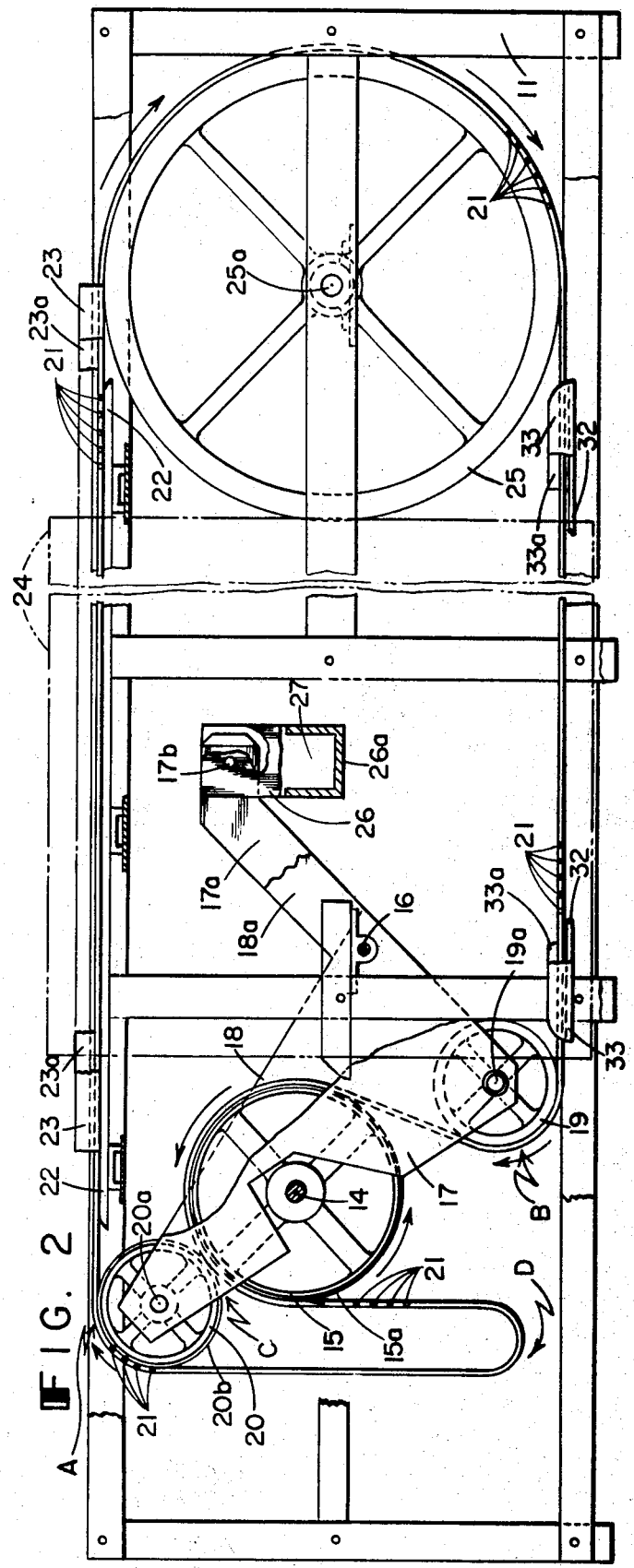

Patented Oct. 27, 1970                  3,536,185

3,536,185

FURNACE CONVEYOR DRIVE

BACKGROUND OF INVENTION

This invention relates to a drive system for endless conveyors through a furnace. In particular it relates to a furnace conveyor system wherein the tension on the belt is automatically maintained at a minimum at no load and adjusted in accordance with the applied load.

In conventional belt conveyor systems, it is customary to set the belt tension for maximum load to avoid slippage. Where a metal belt conveyor system is used in conjunction with high temperature devices, such as furnaces or ovens, the belt deformation, strength loss and deterioration caused by the heat are substantially proportional to the tension applied. Thus, where a belt is always maintained at maximum tension, there is rapid deformation, strength loss and deterioration of the belt. Although it is possible to adjust the tension manually as the load changes, and thus avoid such problems with the belt, such intermittent changing of tension is difficult, interrupts the flow process and is hence highly undersirable and costly.

One object of this invention is to provide a furnace conveyor drive system wherein the tension is at a minimum at no load and is automatically adjusted to the applied load.

Other objects and advantages of this invention will appear from the description and claims which follow and from the appended drawings.

SUMMARY OF INVENTION

This invention comprises generally an endless conveyor system having a load-carrying run going through the furnace and a return run. The endless metal belt of the conveyor system is driven by engagement with a driving pulley located between the load-carrying and return runs. Engaging the belt and associated with the driving pulley, are a pressure pulley and an idler pulley, each supported by a separate portion of a support member pivotally mounted on the frame of the conveyor system. The idler pulley is spaced away from the driving pulley and is in contact with the belt going to the driving pulley. The pressure pulley picks up the belt coming off the driving pulley and normally has grazing contact with a portion of the belt in contact with the driving pulley. From the pressure pulley the belt forms a substantially freely hanging loop (catenary) and either goes back around the pressure pulley or around a conventional fixed pulley.

The support member has associated means at one end for maintaining the belt tension at a minimum when there is no load. In one form, the means comprises an adjustable counterweight to the weight of the pressure and idler rollers carried by the support member. In another form, the means comprises a spring attached between the frame and the support member. With load there is pressure on the idler pulley which causes the pressure pulley to press against the driving pulley. Relief of the pressure on the idler pulley restores the balanced position. The loop may be used as such or may carry a weight, if desired, to further adjust the tension at no load.

The belt running out from the top of the loop is at substantially minimum tension. As load is applied to the upper run of the belt, the pull of the driving pulley on the loaded belt increases the tension. This increase in tension causes the idler pulley to move and thus cause the pressure pulley to press against the belt to form a bite between the driving pulley and the pressure pulley. This increase in pressure prevents slippage and maintains the increased tension as long as there is the particular load on the upper run of the belt. If the load on the upper run of the belt is relieved, the tension decreases permitting the idler pulley to be moved back and thus at the same time relieves the pressure of the pressure pulley until it is just in slipping contact. Proportionate loads bring about proportionate increases in tension.

This combination of driving pulley, pivotally supported idler and pressure pulleys, and hanging loop may be located on either the exit or entrance end of the conveyor system, as re-

BRIEF DESCRIPTION OF DRAWINGS

FIG. 1 is a plan view of one embodiment of this invention with the metal belt shown partially schematically and with partial cutaway (an oven being shown in phantom) and the length being interrupted.

FIG. 2 is an elevation with partial cutaway of the embodiment illustrated in FIG. 1.

SPECIFIC EXAMPLES OF INVENTION

Figure 3:
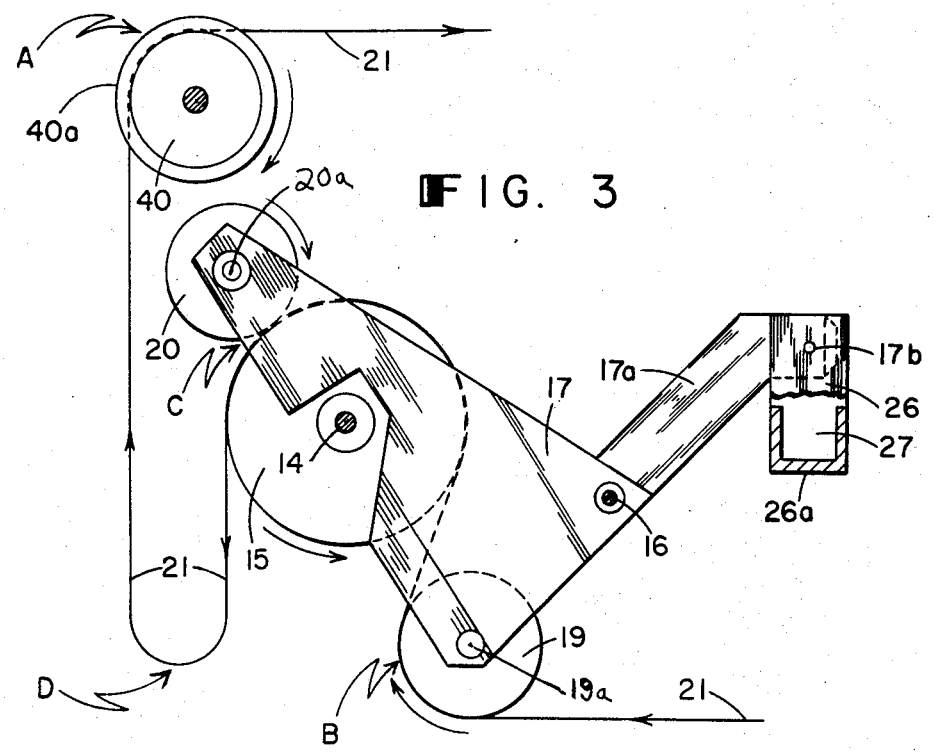
FIG. 3 is a schematic view showing a modification of the embodiment illustrated in FIGS. 1 and 2.

The embodiment illustrated in the FIGS. 1 and 2 comprises an endless conveyor for use in conjunction with an oven. A drive shaft 14 is journaled in the frame 11 and is driven by a gear box 13 actuated by a motor 12. The drive shaft 14 supports a driving drum 15 having a polyurethane outer surface as its lagging. To the right of the driving drum 15 is a shaft 16 journaled in the frame 11 and supporting a pair of plates 17 and 18. The plates are disposed on each side of the driving drum 15 and support a journaled shaft 20a to the upper left of the driving drum and journaled shaft 19a to the lower right of the driving drum. The pressure drum 20 has a polyurethane lagging 20b and is mounted on shaft 20a so as to be, with no load, in grazing contact with the portion of the metal belt 21 passing over the driving drum 15 and in the second quadrant with respect to drum 15. On shaft 19a is mounted an idler drum 19 positioned so that it is spaced away from the driving drum 15 with no bite between drum 15 and drum 19 with respect to any portion of belt 21. The plates 17 and 18 have extensions 17a and 18a on the side of shaft 16 opposite to drums 19 and 20. These extensions support a bucket 27 on pivots 17b and 18b, the bucket having walls 26 and 26a for use with selected counterweights.

The upper run of belt 21 begins at the top side of drum 20 (A) and extends, supported by a flat table 22 having sides 23 and 23a, through an oven 24 (shown in phantom) to the upper side (E) of fixed reversing drum 25 supported on a shaft 25a journaled to the frame 11. The lower run of the belt 21 comes off the bottom of drum 25 and, supported by a flat table 32 having sides 33 and 33 and 33a, extends to the under side (B) of drum 19 and thence over the top of drum 15 to the bite area (C) between drums 15 and 21 and thence forms a hanging loop D before returning to the topside of drum 20.

If a load is applied to the upper run of the belt 21, the pull of the driving drum 15 causes an increase in tension. This increase in tension lifts the drum 19 which, when it rises causes the frame 17—18 to pivot and then push the drum 20 out of biting contact at C with the belt. The increased tension is maintained in accordance with the load that is applied. It should be noted that at point A there is effectively minimum tension because of hanging loop D. The pressure of the load on the belt against the table 22 does, however, cause an increase in drag and thus move the drum 20 out of biting contact with the belt 21 at C. With no load, drum 20 acts as a normal reversing drum, and drum 19 as an ordinary idler drum, with the tension being supplied solely by the engagement on the upper surface of drum 15.

When this conveyor system was used with a furnace of 1150°C and running constantly, the useful time of the belt was found to increase almost fifty fold, as compared with a system having a conventional conveyor drive where the belt tension was normally manually adjusted for a particular load. In this case the loading varied from 2 pounds per running foot empty to 12 pounds per running foot with maximum load, with a 12 inch belt and a length of 20 feet between the two reversing drums.

Figure 4:
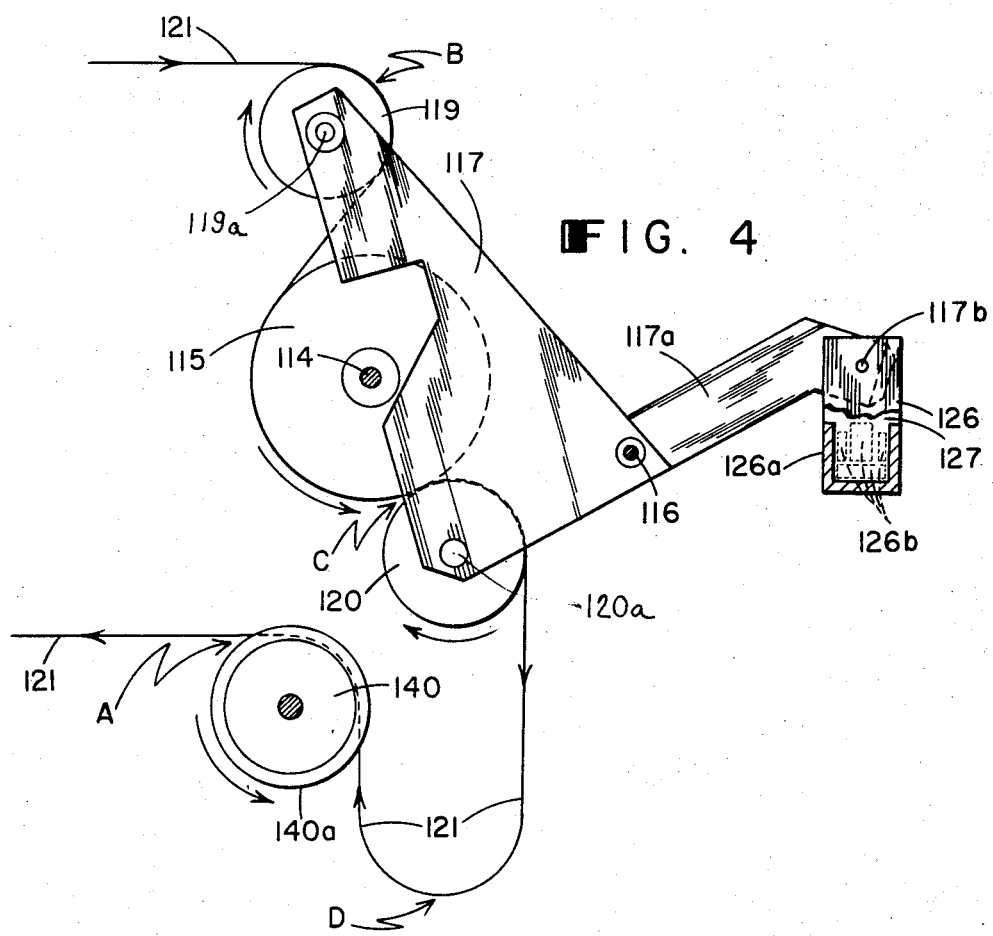
FIG. 4 is a schematic view showing the combination of pulleys located at the exit and with respect to the load.

In the embodiment illustrated in FIG. 3, the pressure pulley does not act as the reversing pulley, but a separate independent guide pulley 40, having flanges 40a, which is in fixed position, is provided wherein the belt after leaving the bite between the driving pulley and pressure pulley forms the In the embodiment illustrated in FIG. 4, the drive is at the exit end. The support member 117 is pivotally mounted on shaft 114 journaled in the frame and supporting idler pulley 119 and pressure pulley 120. Plate 117 has extension 117a supporting bucket 127 on pivot 117b which has walls 126 and 126a for use with selected counterweight 126b. The belt 121 moves over the idler pulley 119 then down around the driving pulley 115 (mounted on shaft 114) and up to biting engagement with the pressure pulley 120, then around pulley 120 to the hanging loop D and thence upward to the guide pulley 140, having flanges 140a, to begin the return run.

Although the independent guide pulley is not essential to the practice of this invention, it does have several marked advantages such as independent height adjustment and location as well as providing a flange for the guiding of the belt which would normally not be incorporated into the pressure pulley.

While several embodiments of this invention have been described in detail, it will be understood that the invention is not to be limited to the particular constructions set forth, since various changes in the form, proportions and arrangement of parts, and in details of construction may be resorted to without departing from the spirit and scope of the invention or destroying any of the advantages obtained in the same, heretofore described and defined in the following claims.

I claim:

1. A furnace conveyor comprising an endless belt, one run of which receives the material to be conveyed and is adapted to go through the furnace and other run of which is the return run; said belt moving, at one side of the system, against an idler pulley to a fixed driving pulley, then down past a pressure pulley and up to form a substantially freely hanging loop and thence back towards the other side of the system; the idler pulley and the pressure pulley being supported on separate portions of a support member pivotally mounted on the frame of the conveyor; said support member having associated pulling means at one end for maintaining belt tension at a minimum when there is no load; the idler pulley being spaced away from any mutual belt contact with the driving pulley; the pressure pulley being, at no load, in grazing contact with a portion of the belt which is also in contact with said driving pulley; the parts being so arranged that mutual pressure between the belt and idler pulley causes said pressure pulley to exert biting action on said belt portion contacting said driving pulley.

2. The furnace conveyor of claim 1 wherein said associated means comprises adjustable counterweights to the weight of the pressure and idler pulleys.

3. The conveyor of claim 1 wherein the loop hangs on the driving pulley and a separate, fixed guide pulley.

4. The conveyor of claim 1 wherein the surfaces of both said driving pulley and said pressure pulley are covered with a resilient material.

5. The conveyor of claim 1 wherein both said upper run and said lower run are supported substantially flat.

6. The conveyor of claim 1 wherein the loop hangs on the driving pulley and on the pressure pulley; the latter acting as a reversing pulley.